(12) United States Patent
Chien (10) Patent No.: US 10,263,773 B2
(45) Date of Patent: Apr. 16, 2019

(54) METHOD FOR UPDATING A PUBLIC KEY

(71) Applicant: National Chi Nan University, Puli, Nantou (TW)

(72) Inventor: Hung-Yu Chien, Nantou (TW)

(73) Assignee: NATIONAL CHI NAN UNIVERSITY, Puli, Nantou (TW)

( * ) Notice: Subject to any disclaimer, the term of this patent is extended or adjusted under 35 U.S.C. 154(b) by 122 days.

(21) Appl. No.: 15/626,388

(22) Filed: Jun. 19, 2017

(65) Prior Publication Data

US 2017/0373847 A1    Dec. 28, 2017

(30) Foreign Application Priority Data

Jun. 23, 2016    (TW) .............................. 105119690 A (51) Int. Cl.
*H04L 9/08*    (2006.01)
*H04L 9/06*    (2006.01)
*H04L 9/32*    (2006.01)

(52) U.S. Cl.
CPC .......... *H04L 9/0891* (2013.01); *H04L 9/0643* (2013.01); *H04L 9/0861* (2013.01); *H04L 9/3221* (2013.01); *H04L 9/3242* (2013.01); *H04L 9/3268* (2013.01); *H04L 2209/24* (2013.01)

(58) Field of Classification Search
CPC .................................... H04L 9/30; H04L 9/08
USPC ........................... 713/155, 156; 380/30, 277
See application file for complete search history.

(56) References Cited

U.S. PATENT DOCUMENTS

2007/0116269 A1\* 5/2007 Nochta ................. H04L 9/0891
380/30

\* cited by examiner

*Primary Examiner* — Izunna Okeke
(74) *Attorney, Agent, or Firm* — Merchant & Gould P.C.

(57) ABSTRACT

A method for updating a public key is provided. The method includes: acquiring, by a transmitting-end device, a first hash value calculated based on a first current public key; generating a first update public key and a first update private key; generating an update string such that a hash value of a hash function calculated based at least on the first update public key and the update string is equal to the first hash value; calculating, by a receiving-end device, a second hash value based at least on the first update public key and the update string according to the hash function; and verifying the first update public key by comparing the first hash value and the second hash value.

6 Claims, 3 Drawing Sheets

METHOD FOR UPDATING A PUBLIC KEY

CROSS-REFERENCE TO RELATED APPLICATION

This application claims priority of Taiwanese Patent Application No. 105119690, filed on Jun. 23, 2016.

FIELD

The disclosure relates to a method for updating a public key.

BACKGROUND

Generally, a sender sending a data file (e.g., a text file) may execute a digital signing algorithm on the data file using a private key, so as to generate a digital signature. When the data file signed with the digital signature is received by a receiver, the receiver may execute a verifying algorithm to verify the authenticity of the data file, using a public key corresponding with the private key.

In order to ensure that the receiver obtains the authentic public key, a public key infrastructure (PKI) may be involved. In practice, the sender may register at a certificate authority (CA) so as to "bind" the public key to an identity of the sender. Then, the receiver may request from the CA a digital certificate that includes the proper public key bound to the identity of the sender.

In the cases when the private key of the sender is compromised, or when the digital certificate has expired, the sender may need to communicate with the CA in order to update the public key as well as the digital certificate.

SUMMARY

Therefore, one object of the disclosure is to provide a method for updating a public key without having to communicate with the certification authority.

According to one embodiment of the disclosure, the method is implemented by a transmitting-end device and a receiving-end device. The transmitting-end device is associated with a first current key pair including a first current public key and a first current private key. The method includes steps of:

a) acquiring, by the receiving-end device, a first hash value according to a digital certificate that is received from a certification authority (CA) device, the first hash value being calculated by the CA device based at least on the first current public key according to a hash function, the digital certificate being provided by the CA device to include at least the first current public key and the first hash value;

b) generating, by the transmitting-end device, a first update key pair that corresponds with the first current key pair and that includes a first update public key and a first update private key;

c) generating, by the transmitting-end device, a second update key pair that corresponds with the second current key pair and that includes a second update public key and a second update private key;

d) generating, by the transmitting-end device, an update string according to the first update public key, the second update public key, and at least one of the first update private key or the first current private key, wherein the update string is one such that a hash value of the hash function calculated based at least on the first update public key, the second update public key, and the update string is made to be equal to the first hash value;

e) transmitting, by the transmitting-end device, the first update public key, the second update public key, and the update string to the receiving-end device;

f) calculating, by the receiving-end device, a second hash value based at least on the first update public key, the second update public key, and the update string according to the hash function; and g) verifying, by the receiving-end device, authenticity of the first update public key and the second update public key when the second hash value calculated in step e) is equal to the first hash value acquired in step a).

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
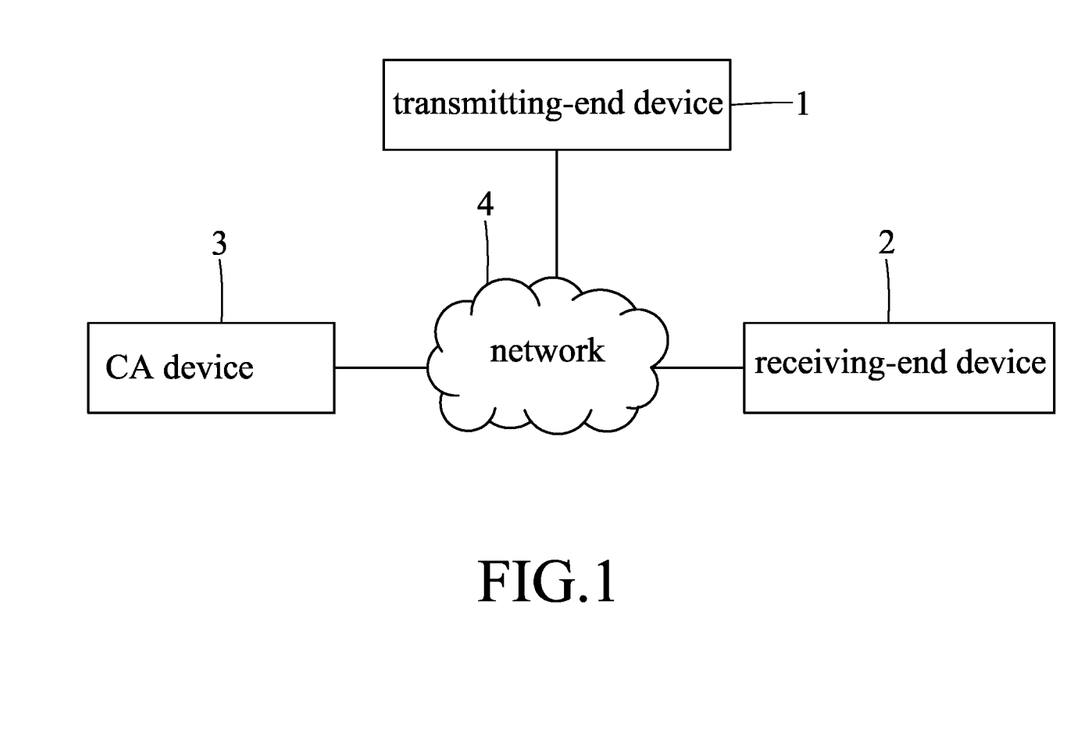
FIG. 1 is a block diagram illustrating a system, according to one embodiment of the disclosure.

FIG. 1 is a block diagram illustrating a system including a transmitting-end device 1, a receiving-end device 2 and a certificate authority (CA) device 3, according to one embodiment of the disclosure. The transmitting-end device 1, the receiving-end device 2 and the CA device 3 are capable of communicating with one another via a network 4 (e.g., the Internet).

Each of the transmitting-end device 1 and the receiving-end device 2 may be embodied using, for example, a personal computer, a laptop, a tablet, a mobile phone, etc. Each of the transmitting-end device 1 and the receiving-end device 2 may include a processor and a storage component storing instructions therein. As such, the processor of each of the transmitting-end device 1 and the receiving-end device 2 may be capable of performing operations as described in the following paragraphs.

The CA device 3 may be embodied using a computer server that is associated with and operated by a particular CA, and stores a CA public key and a CA private key therein.

Figure 2:
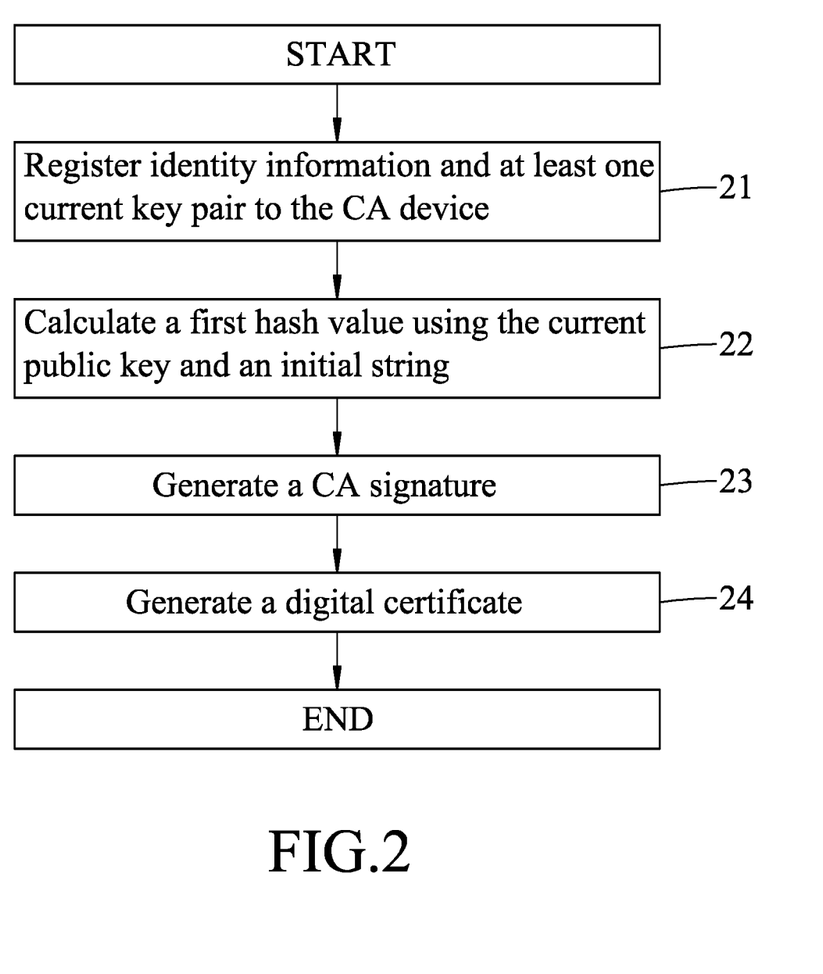
FIG. 2 is a flowchart illustrating steps of a process to generate a digital certificate, according to one embodiment of the disclosure.

FIG. 2 is a flowchart illustrating steps of a process to generate a digital certificate using the system as shown in FIG. 1, according to one embodiment of the disclosure.

In step 21, the transmitting-end device 1 is operated to generate at least one current key pair (or current key pairs), and then to communicate with the CA device 3, in order to register identity information associated with the transmitting-end device 1 and the at least one current key pair (or current key pairs) to the CA device 3. Each of the at least one current key pair includes a current public key and a current private key.

In step 22, the CA device 3 calculates a first hash value using the current public key and an initial string. Specifically, the CA device 3 applies a hash function to the current public key and the initial string, in order to obtain the first hash value. In this embodiment, the hash function is a Chameleon hash function (CHash), and the first hash value is represent by CHash(current public key, initial string, . . . ). It should be noted that the representation of the hash function CHash( . . . ) indicates that the hash function is one with variable parameters. It should be noted that the initial string may have no specific pattern, or may have a specific pattern unrelated to the current public key, or may have a specific pattern related to the current public key. The details of the initial string are shown in the following examples.

Afterward, in step 23, the CA device 3 executes a digital signing algorithm on a message using the CA private key, so as to generate a CA signature. In this embodiment, the message includes the first hash value (i.e., the message may be composed entirely by the first hash value or may include additional content).

In step 24, the CA device 3 generates a digital certificate that includes the identity information of the transmitting-end device 1, the current public key(s) and the CA signature.

After the above process, the receiving-end device 2 may operate to verify the authenticity of the current public key(s) included in the digital certificate upon receipt of the digital certificate.

In order to achieve this, the receiving-end device 2 is operated to obtain the CA public key and the digital certificate, which includes the first hash value, from the CA device 3. Then, the receiving-end device 2 may use the CA public key to verify the authenticity of the CA signature included in the digital certificate. When it is verified that the CA signature is authentic, it is then determined that the current public key(s) is (are) also authentic.

In the cases when a private key of the transmitting-end device 1 is compromised, when the digital certificate has expired, or when periodical renewing is desirable to reduce risks, the sender may operate the transmitting-end device 1 to perform an update process in order to update the public key (s) based on a new private key.

Figure 3:
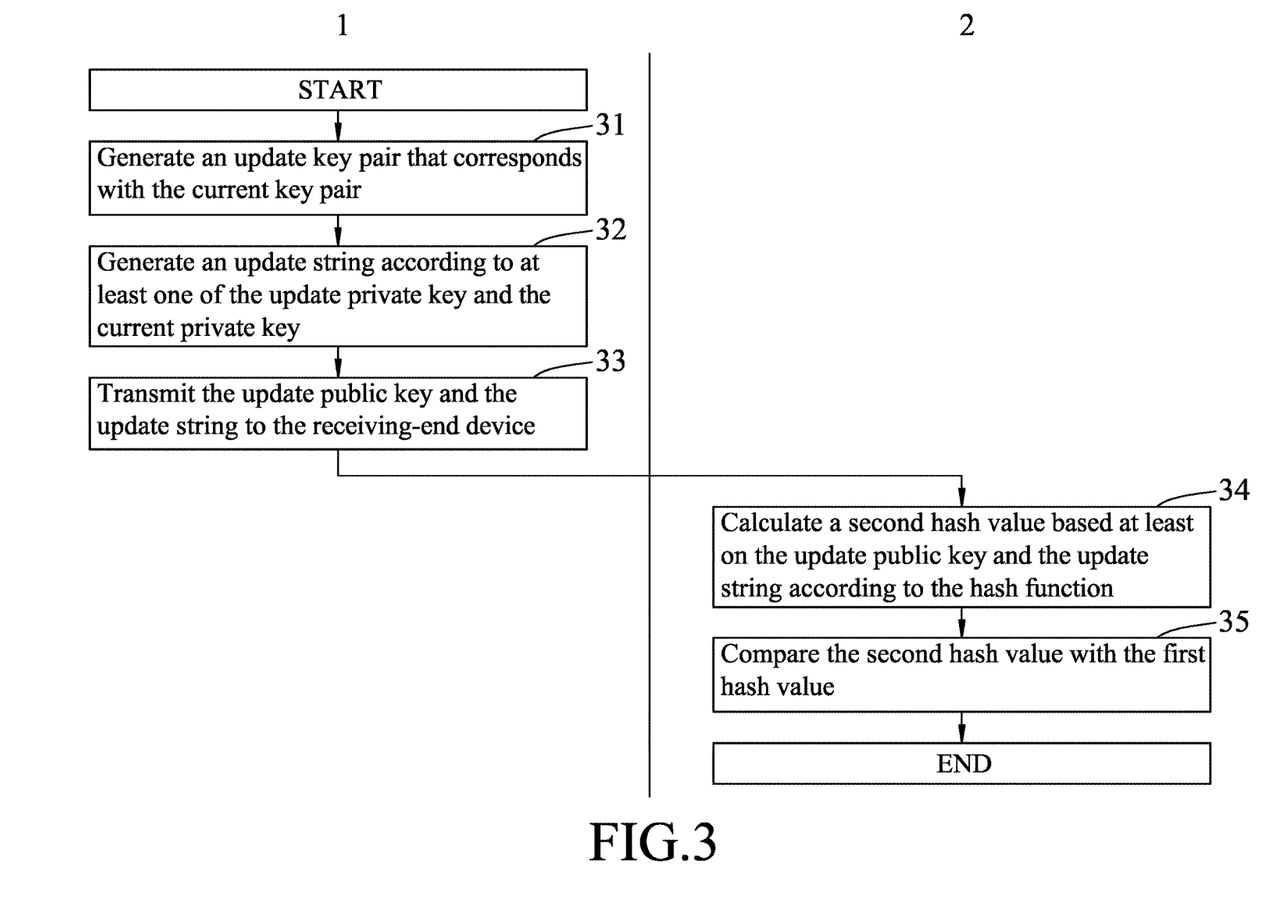
FIG. 3 is a flow chart illustrating steps of a method for updating a public key, according to one embodiment of the disclosure.

FIG. 3 is a flow chart illustrating steps of a method for updating the public key(s), according to one embodiment of the disclosure.

In step 31, the transmitting-end device 1 generates one or more update key pair(s) that corresponds with the current key pair(s) and that includes an update public key(s) and an update private key(s). In one example, two current key pairs are generated in step 21, and in step 31, two update key pairs are generated for corresponding with the two current key pairs, respectively.

Afterward, in step 32, the transmitting-end device 1 generates an update string according to at least one of the update private key or the current private key.

Specifically, the update string is generated in a manner such that a hash value of the hash function calculated based at least on the update public key(s) and the update string is made to be equal to the first hash value. The above relation may be expressed by the equation:

$$CHash(\text{current public key(s), initial string}, \ldots) = CHash(\text{update public key(s), update string}, \ldots).$$

The generation of the current key pair and the update string may be done in a number of ways, which will be described in detail in later paragraphs.

In step 33, the transmitting-end device 1 transmits the update public key(s) and the update string to the receiving-end device 2.

In step 34, the receiving-end device 2 calculates a second hash value based at least on the update public key(s) and the update string according to the hash function. In addition, the receiving-end device 2 may previously obtain the first hash value according to the digital certificate received from the CA device 3. In some embodiments, the receiving-end device 2 may obtain the first hash value by applying the hash function to the current public key(s) and the initial string included in the digital certificate.

Then, in step 35, the receiving-end device 2 verifies authenticity of the update public key(s). Specifically, the receiving-end device 2 compares the second hash value calculated in step 34 with the previously obtained first hash value. When the second hash value is equal to the first hash value, the authenticity of the update public key(s) is verified. Otherwise, the receiving-end device 2 determines that the update public key(s) is(are) inauthentic.

In some embodiments, the receiving-end device 2 may further perform a zero-knowledge proof (ZKP) on the update key pair. A result of the ZKP may also indicate the authenticity of the update public key. For example, when the receiving-end device 2 determines that the second hash value is equal to the first hash value and the result of the ZKP on the update public key is authentic, the authenticity of the update public key is verified. Details regarding the ZKP are known in the field and are omitted herein for the sake of brevity.

Based on the characteristics of the Chameleon hash function (specifically, the Chameleon hash function as a cryptographic hash function is collusion resistant, meaning that it is difficult to obtain two different inputs to produce an identical output) and the manner in which the update string is generated, it is rather difficult for an inauthentic third party to be able to generate, with limited computing resources, at least a fake public key (or fake public keys) and a fake string that satisfy the relation:

$$CHash(\text{current public key(s), initial string} \ldots) = CHash(\text{fake public key(s), fake string}, \ldots).$$

It may be even more difficult for the third party to generate the above data to make the result of ZKP indicate the authenticity of the fake public key(s).

Moreover, it is noted that the method for updating the public key(s) as described above does not involve participation of the CA device 3. Instead, the transmitting-end device 1 may directly transmit the update public key(s) and the update string to the receiving-end device 2, which is able to verify the update public key (s) by comparing the first hash value and the second hash value.

In this way, the need to communicate with the CA device 3 is eliminated, thereby reducing the cost for such communication and allowing the public key (s) to be updated even when communication between the transmitting-end device 1 and the CA device 3 cannot be established. Moreover, a number of times that the public key (s) may be updated is proportional to an exponentiation of the security parameters (e.g., a bit length of the key).

It is also noted that the method as described above has the property of forward secrecy of the second private key, and may be incorporated with some protocols with relatively small amount of computation in order to achieve both the properties of involving relatively small amount of computation and forward secrecy of the corresponding session keys. The session keys here refer to the keys generated in each session and the calculation of the session keys involve the second update key pairs.

In use, the method as described with reference to FIG. 3 may be implemented using a number of ways, described respectively in the following examples. In the examples, the following symbols will be used to represent certain terms, where:

CHash( . . . ) represents the Chameleon hash function;
$\text{Sig}_{CA}$ ( . . . ) represents the CA signature;
$\text{DCert}_U$ represents the digital certificate for dynamic public keys;
$\text{Pub1}_{U,0}$ represents a first current public key;
$\text{Priv1}_{U,0}$ represents a first current private key;
$\text{Pub2}_{U,0}$ represents a second current public key;
$\text{Priv2}_{U,0}$ represents a second current private key;
$\text{Pub1}_{U,i}$ represents a first update public key corresponding with the first current public key in the $i^{th}$ time of the update process;
$\text{Priv1}_{U,i}$ represents a first update private key corresponding with the first current private key in the $i^{th}$ time of the update process;
$\text{Pub2}_{U,i}$ represents a second update public key corresponding with the second current public key in the $i^{th}$ time of the update process;
$\text{Priv2}_{U,i}$ represents a second update private key corresponding with the second current private key in the $i^{th}$ time of the update process;
$r_0$ represents the initial string;
$r_i$ represents the update string used in the $i^{th}$ time of update process;
$\mathfrak{R}_U$ represents any necessary information used for generating the digital certificate other than the public key;
ZK-proof (K) represents the zero-knowledge proof on knowledge K; and
String A∥string B represents a concatenation of string A and string B.

In a first example, a Chameleon hash function as described in the document "Krawczyk, H., Rabin, T.: 'Chameleon signatures'. Seventh ISOC Network and Distributed System Security Symp., San Diego, Calif., USA, 2000, pp. 42-53." is employed. In this example, the Chameleon hash function is defined by:

$$CHash(Y,m,r) = g^{h(m,Y)} Y^r \bmod p.$$

Two prime numbers p and q are defined to satisfy $p=kq+1$. The number q qualifies as a large prime number. The symbol g is a generator of a subgroup of $Z^*_p$ with an order of q. The symbol h( . . . ) represents a cryptographic hash function.

Employing the above, in step 21, transmitting-end device 1 generates two current key pairs associated with the transmitting-end device 1. In particular, a first current key pair $(\text{Pub1}_{U,0} = g^{x1_0}, \text{Priv1}_{U,0} = x1_0)$ including a first current public key and a first current private key, and a second current key pair $(\text{Pub2}_{U,0} = g^{x2_0}, \text{Priv2}_{U,0} = x2_0)$ including a second current public key and a second current private key are generated, with $x1_0 \in Z^*_q$, $x2_0 \in Z^*_q$.

Then, in steps 22 to 24, the CA device 3 generates the digital certificate. In particular, the digital certificate satisfies the relation:

$$DCert_U = \mathfrak{R}_U \| I \| \text{Pub1}_{U,0} \| (\text{Pub2}_{U,0}, r_0) \|$$
$$Sig_{CA}(\mathfrak{R}_U \| CHash(\text{Pub1}_{U,0}, \text{Pub2}_{U,0}, r_0)),$$

where I represents the identity information associated with the transmitting-end device 1, and the first hash value may be calculated as:

$$CHash(\text{Pub1}_{U,0}, \text{Pub2}_{U,0}, r_0) = g^{h(\text{Pub2}_{U,0}, \text{Pub1}_{U,0})} \text{Pub1}_{U,0}^{r_0} \bmod p.$$

In this example, the first hash value is calculated based on the first current public key, the second current public key and the initial string, and the initial string has no specific pattern and may be generated randomly.

In step 32, when it is intended to update the public key for the $i^{th}$ time, the transmitting-end device 1 generates a first update key pair that corresponds with the first current key pair, and a second update key pair that corresponds with the second current key pair. In particular, the first update key pair is expressed by $(\text{Pub1}_{U,i} = g^{x1_i}, \text{Priv1}_{U,i} = x1_i)$, and the second update key pair is expressed by $(\text{Pub2}_{U,i} = g^{x2_i}, \text{Priv2}_{U,i} = x2_i)$, with $x1_i \in Z^*_q$, $x2_i \in Z^*_q$.

In step 33, the transmitting-end device 1 generates the update string, which is expressed by $r_i = [h(\text{Pub2}_{U,0}, \text{Pub1}_{U,0}) + x1_0 \cdot r_0 - h(\text{Pub2}_{U,i}, \text{Pub1}_{U,i})] x1_i^{-1} \bmod q$.

That is to say, the update string is generated according to the first/second update public key, the first current private key, and the first update private key.

In step 34, the receiving-end device 2 calculates a second hash value using $$CHash(\text{Pub1}_{U,i}, \text{Pub2}_{U,i}, r_i) = g^{h(\text{Pub2}_{U,i}, \text{Pub1}_{U,i})} \text{Pub1}_{U,i}^{r_i} \bmod p.$$

That is to say, the second hash value is calculated based on the first update public key, the second update public key and the update string. It may be mathematically proved that the second hash value is identical to the first hash value.

In step 35, the receiving-end device 2 verifies the digital certificate using the CA public key. Then, the receiving-end device 2 compares the first hash value with the second hash value.

In this example, the receiving-end device 2 further determines whether the zero-knowledge proof regarding the first update public key ZK-proof($\log_g \text{Pub1}_{U,i}$) is true. When it is determined that the first hash value is identical to the second hash value and the zero-knowledge proof is true, the receiving-end device 2 may determine that both the first update public key and the second update public key are authentic.

In this example, based on the characteristics of the Chameleon hash function and the manner in which the update string is generated, it may be rather difficult for a third party to be able to generate, with limited computing resources, at least one fake first public key, one fake second public key, and one fake string to satisfy the relation:

$$CHash(\text{Pub}_{1,U,0}, \text{Pub}_{2U,0}, r_0) = CHash(\text{fake first public key, fake second public key, fake string})$$

It may be even more difficult for the third party to generate the above data to make ZK-proof ($\log_g \text{Pub1}_{U,i}$) be deemed as true.

In a second example, a Chameleon hash function as described in the document "G. Ateniese and B. de Medeiros, Identity-based chameleon hash and applications, FC 2004, LNCS 3110, pp. 164-180, Springer-Verlag, 2004." is employed. In this example, the Chameleon hash function is defined by:

$$CHash(Y,m,r=(t,s)) = t - (Y^e g^s \bmod p) \bmod q.$$

The numbers p and q both qualify as large prime numbers, and are defined to satisfy $p=2q+1$. The symbol g is a generator of a subgroup of $Q_p$ with an order of q, $Q_p$ being a quadratic residues modulo q, and $Q_p \in Z^*_p$. The symbol h( . . . ) represents a cryptographic hash function. Additionally, $t, s \in_R Z^*_q$, $e = h(m,t)$.

Employing the above, in step 21, the transmitting-end device 1 generates two current key pairs bound to the identity of the sender. In particular, a first current key pair $(\text{Pub1}_{U,0} = g^{x1_0}, \text{Priv1}_{U,0} = x1_0)$ including a first current public key and a first current private key, and a second current key pair $(\text{Pub2}_{U,0} = g^{x2_0}, \text{Priv2}_{U,0} = x2_0)$ including a second current public key and a second current private key are generated, with $x1_0 \in Z^*_q$, $x2_0 \in Z^*_q$.

Then, in steps 22 to 24, the CA device 3 generates the digital certificate. In particular, the digital certificate satisfies the relation:

$$DCert_U \equiv \Re_U \| I \| Pub1_{U,0} \| (Pub2_{U,0}, r_0 \equiv (t_0, s_0)) \| Sig_{CA}(\Re_U \| CHash(Pub1_{U,0}, Pub2_{U,0}, r_0)) \equiv (t_0, s_0)),$$

where I represents the identity information, $t_0$ represents an initial value of t, $s_0$ represents an initial value of s, and the first hash value may be calculated as:

$$CHash(Pub1_{U,0}, Pub2_{U,0}, r_0 \equiv (t_0, s_0)) \equiv t_0 - (Pub1_{U,0}^{h(Pub2_{U,0}, t_0)} \cdot g^{s_0} \bmod p) \bmod q.$$

That is to say, the first hash value is calculated based on the first current public key, the second current public key and the initial string, and the initial string has a specific pattern unrelated to the first and second current public keys.

In step 32, when it is intended to update the public key for the $i^{th}$ time, the transmitting-end device 1 generates a second update key pair that corresponds with the second current key pair. In particular, the second update key pair is expressed by $$(Pub2_{U,i} \equiv g_x^{2i}, Priv2_{U,i} \equiv x2_i), \text{ where } x2_i \in Z^*_q.$$

In step 33, the transmitting-end device 1 generates the update string, which is expressed by $r_i \equiv (t_i, s_i)$, where $t_i = CHash(Pub1_{U,0}, Pub2_{U,0}, r_0 \equiv (t_0, s_0)) + (g^{k'} \bmod p) \bmod q$, $e_i = h(Pub2_{U,i}, t_i)$, $s_i = k' - e_i \cdot x1_0 \bmod q$, $k' \in [1, q-1]$ is a random number.

That is to say, the update string in this example is generated according to the first current public key, the second current public key, the random number, and the first current private key.

In step 34, the receiving-end device 2 calculates a second hash value using $$CHash(Pub1_{U,0}, Pub2_{U,i}, r_i \equiv (t_i, s_i)) \equiv t_i - (Pub1_{U,0}^{h(Pub2_{U,i}, t_i)} \cdot g^{s_i} \bmod p) \bmod q.$$

That is to say, the second hash value is calculated based on the first current public key, the second update public key and the update string. It may be mathematically proved that the second hash value is identical to the first hash value, which is in the form of $CHash(Pub1_{U,0}, Pub2_{U,0}, r_0 \equiv (t_0, s_0))$.

In step 35, the receiving-end device 2 verifies the digital certificate using the CA public key. Then, the receiving-end device 2 compares the first hash value with the second hash value. When it is determined that the first hash value is identical to the second hash value, the receiving-end device 2 may determine that the second update public key is authentic.

In this example, based on the characteristics of the Chameleon hash function and the manner in which the update string is generated, it may be rather difficult for a third party to be able to generate, with limited computing resources, at least one fake second private key, one fake second public key, and one fake string to satisfy the relation:

$$CHash(Pub1_{U,0}, Pub2_{U,0}, r_0 \equiv (t_0, s_0)) = CHash(Pub1_{U,0}, \text{fake second public key}, \text{fake string}).$$

In a third example, a Chameleon hash function as described in the document "Chen, F. Zhang, and K. Kim, Chameleon hashing without key exposure, ISC 2004, LNCS 3225, pp. 87-98, Springer-Verlag, 2004." is employed. In this example, the Chameleon hash function is defined by:

$$CHash(I, y, m, (g^a, y^a)) = (gI)^{h(m)} y^a.$$

In this example, $y = g^x$, $a \in Z^*_q$, and the symbol $h(\ldots)$ represents a cryptographic hash function. The numbers p and q each qualify as a large prime number, and the number $p-1$ is divisible by q. The symbol g is a generator of a subgroup of $Z^*_p$ with an order of q. Furthermore, $I = h(ID_S \| ID_R \| ID_T)$, where $ID_S$ and $ID_R$ represent the identity information of the sender and the receiver, respectively, and $ID_T$ represents a transaction identity whose value may be changed in response to the updates.

Employing the above, in step 21, the transmitting-end device 1 generates two current key pairs bound to the identity of the sender. In particular, a first current key pair $(Pub1_{U,0} = g^{x1_0}, Priv1_{U,0} \equiv x1_0)$ including a first current public key and a first current private key, and a second current key pair $(Pub2_{U,0} = g^{x2_0}, Priv2_{U,0} \equiv x2_0)$ including a second current public key and a second current private key are generated, with $x1_0 \in Z^*_q$, $x2_0 \in Z^*_q$.

Then, in steps 22 to 24, the CA device 3 generates the digital certificate. In particular, the digital certificate satisfies the relation:

$$DCert_U \equiv \Re_U \| I_0 \| Pub1_{U,0} \| (Pub2_{U,0}, r_0) \| Sig_{CA}(\Re_U \| CHash(I_0, Pub1_{U,0}, Pub2_{U,0}, r_0 \equiv (g^{a_0}, Pub1_{U,0}^{a_0}))),$$

where $CHash(I_0, Pub1_{U,0}, Pub2_{U,0}, r_0 \equiv (g^{a_0}, Pub1_{U,0}^{a_0})) = (gI_0)^{h(Pub2_{U,0})} Pub1_{U,0}^{a_0}$ represents the first hash value, $a_0$ represents an initial value of a, $I_0 = h(ID_S \| ID_R \| ID_{T0})$ and $ID_{T0}$ is an initial value of $ID_T$.

That is to say, the first hash value is calculated based on the first current public key, the second current public key and the initial string, and the initial string has a specific pattern related to the first current public key.

In step 32, when it is intended to update the public key for the $i^{th}$ time, the transmitting-end device 1 generates a second update key pair that corresponds with the second current key pair. In particular, the second update key pair is expressed by $(Pub2_{U,i} \equiv g^{x2}_i, Priv2_{U,i} \equiv x2_i)$, with $x1_i \in Z^*_q$, $x2_i \in Z^*_q$.

In step 33, the transmitting-end device 1 generates the update string, which is expressed by $r_i \equiv (g^{a_i}, Pub1_{U,0}^{a_i})$. Specifically, $g^{a_i} = g^{a_0} (gI_0)^{h(Pub2_{U,0})/x1_0} (gI_i)^{-h(Pub2_{U,i})/x1_0}$, $Pub1_{U,0}^{a_i} = Pub1_{U,0}^{a_0} \cdot (gI_0)^{h(Pub2_{U,0})} \cdot (gI_i)^{-h(Pub2_{U,i})}$, $I_i = h(ID_S \| ID_R \| ID_{Ti})$ $ID_{Ti}$ represents a value of $ID_T$ in response to the $i^{th}$ time of update, and $a_i$ represents a value of a in response to the $i^{th}$ time of update.

That is to say, the update string is generated according to at least the first current public key, the second current public key, the second update public key, a random number, and the first current private key.

In step 34, the receiving-end device 2 calculates a second hash value using $$CHash(I_i, Pub1_{U,0}, Pub2_{U,i}, r_i \equiv (g^{a_i}, Pub1_{U,0}^{a_i})) \equiv (gI_i)^{h(Pub2_{U,i})} Pub1_{U,0}^{a_i}.$$

That is to say, the second hash value is calculated based on the first current public key, the second update public key, the update string and the identity information. It may be mathematically proved that the second hash value is identical to the first hash value.

In step 35, the receiving-end device 2 verifies the digital certificate using the CA public key. Then, the receiving-end device 2 compares the first hash value with the second hash value. In this example, the receiving-end device 2 further determines whether the zero-knowledge proof regarding the second update public key ZK-proof $(\log_g g^{a_i} = \log_{Pub1_{U,0}} Pub1_{U,0}^{a_i})$ is true. When it is determined that the first hash value is identical to the second hash value, and the zero-knowledge proof is true, the receiving-end device 2 may determine that the second update public key is authentic.

In this example, based on the characteristics of the Chameleon hash function and the manner in which the update string is generated, it may be rather difficult for a third party to be able to generate, with limited computing resources, at least one fake second public key and one fake string to satisfy the relation:

$$CHash(I_0, Pub1_{U,0}, Pub2_{U,0}, r_0 = (g^{a_0}, Pub1_{U,0}^{a_0})) = \\ CHash(I_i, Pub1_{U,0}, \text{fake second public key}, \text{fake string}).$$

It may be even more difficult for the third party to generate the above data to make ZK-proof ($\log_g g^a = \log_{Pub1_{U,0}} Pub1_{U,0}^{a_i}$) be deemed as true.

In a fourth example, a Chameleon hash function as described in the document "Identity-Based Chameleon Hash Scheme Without Key Exposure Xiaofeng Chen, Fangguo Zhang, Haibo Tian, and Kwangjo Kim 2009." is employed. In this example, the Chameleon hash function is defined by:

$$CHash(ID, I, m, r) = aP + h(m)H(I).$$

Specifically, $a \in_R Z^*_q$, I represents identifying information for distinguishing different transactions, ID represents the identity information of the sender, $h(\ldots)$ represents a cryptographic hash function, $H:\{0,1\}^* \to G_1$ represents a full-domain collision-resistant hash function, $G_1$ represents a gap-Diffie-Hellman (GDH) group that is generated by P and with an order of a prime number q, $r = (aP, e(aP_{Pub}, Q_{ID}))$, where $e: G_1 \times G_1 \to G_2$ is a bi-linear pairing function, $G_2$ represents a cyclic multiplying group with an order of q, $P_{Pub} = xP$ is the system's public key, $Pub1_{U,0} \equiv Q_{ID} = H(ID)$ is the first current public key, $S_{ID} = xQ_{ID}$ is the first current private key, and $x \in_R Z^*_q$.

Employing the above, in step 21, the transmitting device 1 generates one current key pair bound to the identity of the sender. In particular, a second current key pair $(Pub2_{U,0} \equiv Y_0 = x_0P, x_0)$ is generated, with $x_0 \in Z^*_q$.

Then, in steps 22 to 24, the CA device 3 generates the digital certificate. In particular, the digital certificate satisfies the relation:

$$DCert_U = \Re_U \| I_0 \| ID \| (Y_0, r_0) \| Sig_{CA}(\Re_U \| CHash(ID, I_0, Y_0, r_0 = (a_0P, e(a_0P_{Pub}, Q_{ID})))),$$

and the first hash value may be calculated as:

$$CHash(ID, I_0, Y_0, r_0 = (a_0P, e(a_0P_{Pub}, Q_{ID}))) = a_0P + h(Y_0)H(I_0)$$

where $I_0$ is an initial value of I, and $a_0$ is an initial value of a.

That is to say, the first hash value is calculated based on the identity information, the first current public key, the second current public key and the initial string.

In step 32, when it is intended to update the public key for the $i^{th}$ time, the transmitting-end device 1 generates a second update key pair that corresponds with the second current key pair. In particular, the second update key pair is expressed by $((Pub2_{U,i} \equiv Y_i = x_iP, x_i))$.

In step 33, the transmitting-end device 1 generates the update string, which is expressed by $r_i = (a_iP, e(a_iP_{Pub}, Q_{ID}))$, where $a_iP = a_0P + h(Y_0)H(I_0) - h(Y_i)H(I_i)$, $e(a_iP_{Pub}, Q_{ID}) = e(a_iP, S_{ID})$ and $I_i$ represents a value of I in response to the $i^{th}$ time of update.

That is to say, the update string is generated according to at least one of the first current private key or the first update private key.

In step 34, the receiving-end device 2 calculates a second hash value using $$CHash(ID, I_i, Y_i, r_i = (a_iP, e(a_iP_{Pub}, Q_{ID}))) = a_iP + h(Y_i)H(I_i).$$

That is to say, the second hash value is calculated based on the identity information, the second update public key and the update string. It may be mathematically proved that the second hash value is identical to the first hash value.

In step 35, the receiving-end device 2 verifies the digital certificate using the CA public key. Then, the receiving-end device 2 compares the first hash value with the second hash value. When it is determined that the first hash value is identical to the second hash value, the receiving-end device 2 may determine that the second update public key is authentic.

In this example, based on the characteristics of the Chameleon hash function and the manner in which the update string is generated, it may be rather difficult for a third party to be able to generate, with limited computing resources, at least one fake second public key and one fake string to satisfy the relation:

$$CHash(ID, I_0, Y_0, r_0 = (a_0P, e(a_0P_{Pub}, Q_{ID}))) = \\ CHash(ID, I_i, \text{fake second public key}, \text{fake string}).$$

In a fifth example, a Chameleon hash function as described in the document "Key-Exposure Free Chameleon Hashing and Signatures Based on Discrete Logarithm Systems Xiaofeng Chen, Fangguo Zhang, Haibo Tian, Baodian Wei, and Kwangjo Kim 2009." is employed. In this example, the Chameleon hash function is defined by:

$$CHash(L, m, r) = g^a I^{h(m)}.$$

Specifically, $a \in_R Z^*_q$, $Pub1_{U,0} \equiv Y = g^x$ is the first public key, $I = h(Y, L)$, L represents customized identity associated with the transmitting-end device 1 that is part of the identity information and that may be incorporated with other information such as a time stamp, $r = (g^a, Y^a)$, $h: \{0,1\}^* \to \{0,1\}^k$ is a collision-resistant hash function, and g is a generator of a subgroup in $Z^*_p$ with an order of q. The numbers p and q qualify as large prime numbers, and p−1 is divisible by q.

Employing the above, in step 21, the transmitting-end device generates one current key pair associated with the transmitting-end device 1. In particular, a second current key pair $(Pub2_{U,0} \equiv g^{x_{2_0}}, Priv2_{U,0} \equiv x2_0)$ is generated with $x2_0 \in Z^*_q$.

Then, in steps 22 to 24, the CA device 3 generates the digital certificate. In particular, the digital certificate satisfies the relation:

$$DCert_U = \Re_U \| L_0 \| (Pub2_{U,0}, r_0) \| Sig_{CA}(\Re_U \| \\ CHash(L_0, Pub2_{U,0}, r_0 = (g^{a_0}, Y^{a_0})) = g^{a_0} I^{h(Pub2_{U,0})}),$$

where $I = h(Y, L_0)$, and the first hash value may be calculated as:

$$CHash(L_0, Pub2_{U,0}, r_0 = (g^{a_0}, Y^{a_0}))$$

where $L_0$ is an initial value of L, and $a_0$ is an initial value of a.

That is to say, the first hash value is calculated based on the identity information, the first current public key, the second current public key and the initial string.

In step 32, when it is intended to update the public key for the $i^{th}$ time, the transmitting-end device 1 generates a second update key pair that corresponds with the second current key pair. In particular, the second update key pair is expressed by $$(Pub2_{U,i} \equiv g^{x_{2i}}, Priv2_{U,i} \equiv x2_i).$$

In step 33, the transmitting-end device 1 generates the update string, which is expressed by $r_i = (g^{a_i}, Y^{a_i})$. Specifically, $g^{a_i} = g^{a_0} h(Y, L_0)^{h(Pub2_{U,0})} h(Y, L_i)^{-h(Pub2_{U,i})}$, $Y^{a_i} = g^{a_i x_{1_0}}$, and $L_i$ represents a value of L in response to the $i^{th}$ time of update.

That is to say, the update string is generated based on at least the first current private key, the second current public key, and the second update public key.

In step 34, the receiving-end device 2 calculates a second hash value using $$CHash(L_i, Pub2_{U,i}, r_i = (g^{a_i}, Y^{a_i})) \equiv (g^{a_i} I_i^{h(Pub2U,i)}),$$

where $I_i = h(Y, L_i)$.

That is to say, the second hash value is calculated based on the identity information, the first current public key, the second update public key, and the update string. It may be mathematically proved that the second hash value is identical to the first hash value.

In step 35, the receiving-end device 2 verifies the digital certificate using the CA public key. Then, the receiving-end device 2 compares the first hash value with the second hash value.

In this example, the receiving-end device 2 further determines whether the zero-knowledge proof regarding the update string ZK-proof $(\log_g g^{a_i} = \log_Y Y^{a_i})$ is true. When it is determined that the first hash value is identical to the second hash value, and the zero-knowledge proof is true, the receiving-end device 2 may determine that the second update public key are authentic.

In this example, based on the characteristics of the Chameleon hash function and the manner in which the update string is generated, it may be rather difficult for a third party to be able to generate, with limited computing resources, at least one fake second public key and one fake string to satisfy the relation:

$$CHash(L_0, Pub2_{U,0}, r_0 = (g^{a_0}, Y)) = CHash(L_i, \text{fake second public key}, \text{fake string}).$$

It may be even more difficult for the third party to generate the above data to make ZK-proof $(\log_g g^{a_i} = \log_Y Y^{a_i})$ be deemed as true.

In a sixth example, a Chameleon hash function is employed based on elliptic curve cryptography. In this example, the Chameleon hash function is defined by:

$$CHash(Y, m, r) = h(m, Y)P + rY.$$

A number of entities are defined as follows. The symbol $G_1$ represents a cyclical addition group on an elliptic curve with an order of a prime number q. The symbol P is defined as a generator of $G_1$. The symbol $h(\ldots)$ represents a cryptographic hash function.

Employing the above, in step 21, the—transmitting-end device 1 generates two current key pairs bound to the identity of the sender. In particular, a first current key pair $(Pub1_{U,0} \equiv x1_0 P, Priv1_{U,0} \equiv x1_0)$ and a second current key pair including a second current public key and a second current private key $(Pub2_{U,0} \equiv x2_0 P, Priv\,2_{U,0} \equiv x2_0)$ are generated, with $x1_0 \in Z^*_q$, $x2_0 \in Z^*_q$.

Then, in steps 23 and 24, the CA device 3 generates the digital certificate. In particular, the digital certificate satisfies the relation:

$$DCert_U = \mathfrak{R}_U \| I \| Pub1_{U,0} \| (Pub2_{U,0}, r_0) \|$$
$$Sig_{CA}(\mathfrak{R}_U \| CHash(Pub1_{U,0}, Pub2_{U,0}, r_0)),$$

where I represents the identity information that is associated with the transmitting-end device 1, and the first hash value may be calculated as:

$$CHash(Pub1_{U,0}, Pub2_{U,0}, r_0) = h(Pub2_{U,0}, Pub1_{U,0})P + r_0 Pub1_{U,0}.$$

That is to say, the first hash value is calculated based on the first current public key, the second current public key and the initial string.

In step 32, when it is intended to update the public key for the $i^{th}$ time, the transmitting-end device 1 generates a first update key pair that corresponds with the first current key pair, and a second update key pair that corresponds with the second current key pair. In particular, the first update key pair is expressed by $(Pub1_{U,i}, x1_i P, Priv1_{U,i} \equiv x1_i)$, and the second update key pair is expressed by $(Pub2_{U,i} \equiv x2_i P, Priv2_{U,i} \equiv x2_i)$, with $x1_i \in Z^*_q$, $x2_i \in Z^*_q$.

In step 33, the transmitting-end device 1 generates update string, which is expressed by $r_i = [h(Pub2_{U,0} Pub1_{U,0}) + x1_0 \cdot r_0 - h(Pub2_{U,i} Pub1_{U,i})] x1^{-1} \mod q$.

That is to say, the update string is generated according to the first current public key, the second current public key, the first update public key, the second update public key, the first current private key, and the first update private key.

In step 34, the receiving-end device 2 calculates a second hash value using $$CHash(Pub1_{U,i}, Pub2_{U,i}, r_i) = h(Pub2_{U,i}, Pub1_{U,i})P + r_i Pub1_{U,i}.$$

That is to say, the second hash value is calculated based on the first update public key, the second update public key and the update string. It may be mathematically proved that the second hash value is identical to the first hash value.

In step 35, the receiving-end device 2 verifies the digital certificate using the CA public key, and obtains the first hash value. Then, the receiving-end device 2 compares the first hash value with the second hash value. In this example, the receiving-end device 2 further determines whether the zero-knowledge proof regarding the first update public key ZK-proof $(\log_P Pub1_{U,i})$ is true. When it is determined that the first hash value is identical to the second hash value, and the zero-knowledge proof is true, the receiving-end device 2 may determine that both the first update public key and the second update public key are authentic.

In this example, based on the characteristics of the Chameleon hash function and the manner in which the update string is generated, it may be rather difficult for a third party to be able to generate, with limited computing resources, at least one fake first public key, one fake second public key and one fake string to satisfy the relation:

$$CHash(Pub1_{U,0}, Pub2_{U,0}, r_0) = CHash(\text{fake first public key}, \text{fake second public key}, \text{fake string}).$$

It may be even more difficult for the third party to generate the above data to make ZK-proof$(\log_P Pub1_{U,i})$ be deemed as true.

To sum up, the method as described in the above embodiments of the disclosure provides a way for the sender operating the transmitting-end device 1 to update the current key pair(s) without having to communicate with the CA device 3, while the session key based on the generated second update key pair has the property of forward secrecy. The owner can eliminate obsolete private keys from the storage to reduce the risks and generate new keys for the same certificate. It facilitates the public key renewal at reduced validation cost to a verifier. Additionally, the method as described in the above embodiments of the disclosure owns several merits. For example, employing the method, a user is able to renew his/her public key without having to communicate with the certification authority (e.g., the CA device 3). It facilitates session key establishment with perfect forward secrecy. It reduces a verifier's cost of validating the renewed public keys.

In the description above, for the purposes of explanation, numerous specific details have been set forth in order to provide a thorough understanding of the embodiments. It will be apparent, however, to one skilled in the art, that one or more other embodiments may be practiced without some of these specific details. It should be also appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding various inventive aspects.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A method for updating a public key, the method being implemented by a transmitting-end device and a receiving-end device, the transmitting-end device being associated with a first current key pair including a first current public key and a first current private key, the method comprising steps of:
   a) acquiring, by the receiving-end device, a first hash value according to a digital certificate that is received from a certification authority (CA) device, the first hash value being calculated by the CA device based at least on the first current public key according to a hash function, the digital certificate being provided by the CA device to include at least the first current public key and the first hash value;
   b) generating, by the transmitting-end device, a first update key pair that corresponds with the first current key pair and that includes a first update public key and a first update private key;
   b) generating, by the transmitting-end device, a second update key pair that corresponds with the second current key pair and that includes a second update public key and a second update private key;
   c) generating, by the transmitting-end device, an update string according to at least one of the first update private key or the first current private key, wherein the update string is one such that a hash value of the hash function calculated based at least on the second update public key and the update string is made equal to the first hash value;
   d) transmitting, by the transmitting-end device, at least the second update public key and the update string to the receiving-end device;
   e) calculating, by the receiving-end device, a second hash value based at least on the second update public key and the update string according to the hash function; and
   f) verifying, by the receiving-end device, authenticity of the second update public key when the second hash value calculated in step e) is equal to the first hash value acquired in step a), wherein the receiving-end device verifies the authenticity of the update public key further by performing a zero-knowledge proof on the first update key pair,
   the transmitting-end device being further associated with a second current key pair including a second current public key and a second current private key, wherein:
   in step b), the transmitting-end device further generates a second update key pair that corresponds with the second current key pair and that includes a second update public key and a second update private key;

in step c), the transmitting-end device generates the update string according to at least the second update public key and the first current public key, and the first update private key;
   the first hash value is calculated based on the first current public key, the second current public key, and an initial string that is associated with the transmitting-end device; and
   in step e), the second hash value is calculated based on at least the first update public key, the second update public key and the update string.

2. A method for updating a public key, the method being implemented by a transmitting-end device and a receiving-end device, the transmitting-end device being associated with a first current key pair including a first current public key and a first current private key, the method comprising steps of:
   a) acquiring, by the receiving-end device, a first hash value according to a digital certificate that is received from a certification authority (CA) device, the first hash value being calculated by the CA device based at least on the first current public key according to a hash function, the digital certificate being provided by the CA device to include at least the first current public key and the first hash value;
   b) generating, by the transmitting-end device, a first update key pair that corresponds with the first current key pair and that includes a first update public key and a first update private key;
   b) generating, by the transmitting-end device, a second update key pair that corresponds with the second current key pair and that includes a second update public key and a second update private key;
   c) generating, by the transmitting-end device, an update string according to at least one of the first update private key or the first current private key, wherein the update string is one such that a hash value of the hash function calculated based at least on the second update public key and the update string is made equal to the first hash value;
   d) transmitting, by the transmitting-end device, at least the second update public key and the update string to the receiving-end device;
   e) calculating, by the receiving-end device, a second hash value based at least on the second update public key and the update string according to the hash function; and
   f) verifying, by the receiving-end device, authenticity of the second update public key when the second hash value calculated in step e) is equal to the first hash value acquired in step a), wherein the receiving-end device verifies the authenticity of the update public key further by performing a zero-knowledge proof on the first update key pair,
   the transmitting-end device being further associated with a second current key pair including a second current public key and a second current private key, wherein:
   in step b), the transmitting-end device further generates a second update key pair that corresponds with the second current key pair and that includes a second update public key and a second update private key;
   in step c), the transmitting-end device generates the update string according to at least the first current public key;
   the first hash value is calculated based on the first current public key, the second current public key, and the initial string; and in step e), the second hash value is calculated based on the first current public key, the second update public key, the update string and the identity information.

3. A method for updating a public key, the method being implemented by a transmitting-end device and a receiving-end device, the transmitting-end device being associated with a first current key pair including a first current public key and a first current private key, the method comprising steps of:
   a) acquiring, by the receiving-end device, a first hash value according to a digital certificate that is received from a certification authority (CA) device, the first hash value being calculated by the CA device based at least on the first current public key according to a hash function, the digital certificate being provided by the CA device to include at least the first current public key and the first hash value;
   b) generating, by the transmitting-end device, a first update key pair that corresponds with the first current key pair and that includes a first update public key and a first update private key;
   b) generating, by the transmitting-end device, a second update key pair that corresponds with the second current key pair and that includes a second update public key and a second update private key;
   c) generating, by the transmitting-end device, an update string according to at least one of the first update private key or the first current private key, wherein the update string is one such that a hash value of the hash function calculated based at least on the second update public key and the update string is made equal to the first hash value;
   d) transmitting, by the transmitting-end device, at least the second update public key and the update string to the receiving-end device;
   e) calculating, by the receiving-end device, a second hash value based at least on the second update public key and the update string according to the hash function; and
   f) verifying, by the receiving-end device, authenticity of the second update public key when the second hash value calculated in step e) is equal to the first hash value acquired in step a), wherein the receiving-end device verifies the authenticity of the update public key further by performing a zero-knowledge proof on the first update key pair, wherein:
   in step c), the transmitting-end device generates the update string according to at least one of the first current private key the second current public key, or the second update public key;
   the first hash value is calculated based on the identity information, the first current public key, the second current public key, and an initial string that is associated with the transmitting-end device; and
   in step e), the second hash value is calculated based on the identity information, the first update public key and the update string.

4. The method of claim 1, the transmitting-end device being further associated with a second current key pair including a second current public key and a second current private key, wherein:
   in step b), the transmitting-end device further generates a second update key pair that corresponds with the second current key pair and that includes a second update public key and a second update private key;
   in step c), the transmitting-end device generates the update string according to at least the first current public key, the second update public key, a random number, or the first current private key;
   the first hash value is calculated based on the first current public key, the second current public key, and an initial string that is associated with the transmitting-end device; and
   in step e), the second hash value is calculated based on the first update public key, the second update public key and the update string.

5. The method of claim 1, wherein:
   in step c), the transmitting-end device generates the update string according to at least the first current public key;
   the first hash value is calculated based on the identity information, the first current public key, the second current public key, and an initial string that is associated with the transmitting-end device; and
   in step e), the second hash value is calculated based on the identity information, the first update public key and the update string.

6. The method of claim 1, wherein in step a), the hash function is a Chameleon hash function (CHash).

* * * * *